US011477231B2

(12) United States Patent
Bubshait et al.

(10) Patent No.: US 11,477,231 B2
(45) Date of Patent: Oct. 18, 2022

(54) SYSTEM AND METHOD FOR VULNERABILITY REMEDIATION PRIORITIZATION

(71) Applicant: SAUDI ARABIAN OIL COMPANY, Dhahran (SA)

(72) Inventors: Mariam Fahad Bubshait, Damman (SA); Mashael Hassan Alkhalis, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 231 days.

(21) Appl. No.: 16/897,760

(22) Filed: Jun. 10, 2020

(65) Prior Publication Data
US 2021/0392153 A1 Dec. 16, 2021

(51) Int. Cl.
*H04L 9/40* (2022.01)
*G06N 20/00* (2019.01)
*G06F 8/65* (2018.01)

(52) U.S. Cl.
CPC ........... *H04L 63/1433* (2013.01); *G06F 8/65* (2013.01); *G06N 20/00* (2019.01); *H04L 63/145* (2013.01); *H04L 63/1416* (2013.01); *H04L 63/20* (2013.01)

(58) Field of Classification Search
None
See application file for complete search history.

(56) References Cited

U.S. PATENT DOCUMENTS 8,495,747 B1 7/2013 Nakawatase et al.
8,789,192 B2 7/2014 LaBumbard
9,553,888 B2 1/2017 Stiansen et al.
(Continued)

FOREIGN PATENT DOCUMENTS

JP 2019510304 A 4/2019
WO 2018049437 A2 3/2018

OTHER PUBLICATIONS

Blair, Ian, "Mobile App Download and Usage Statistics (2020)", buildfire, Feb. 19, 2019, URL: <https://buildfire.com/app-statistics/> (18 pages).
"Common Vulnerability Scoring System SiIG", First: Improving Security Together, FIRST.org, Inc., Accessed: Jun. 9, 2020, URL: <https://www.first.org/cvss/> (2 pages).
Gurney, Charlotte, "How Threat Intelligence Prioritises Risk in Vulnerability Management", brookcourt: Collaborative Solutions, Brookcourt Solutions Ltd., Nov. 15, 2018, URL: <https://www.brookcourtsolutions.com/how-threat-intelligence-prioritises-risk-in-vulnerability-management/> (9 pages).
(Continued)

*Primary Examiner* — Joseph P Hirl
*Assistant Examiner* — Hassan Saadoun
(74) *Attorney, Agent, or Firm* — Osha Bergman Watanabe & Burton LLP (57) ABSTRACT

A method may include obtaining internal vulnerability data and external vulnerability data regarding various security vulnerabilities among various network elements for a predetermined organization. The method may include determining various exploitability levels for the security vulnerabilities using a model, the external vulnerability data, and the internal vulnerability data. The model may be generated using a machine-learning algorithm. The method may include determining a vulnerability priority for the plurality of security vulnerabilities using the plurality of exploitability levels and organization-specific criteria. The vulnerability priority may describe a sequence that the security vulnerabilities are remediated. The method may further include transmitting a remediation command to one of the network elements. The remediation command may initiate a remediation procedure at the network element to address the security vulnerability.

17 Claims, 6 Drawing Sheets

(56) References Cited

U.S. PATENT DOCUMENTS

| | | | |
|---|---|---|---|
| 10,536,478 | B2 | 1/2020 | Kirti et al. |
| 2007/0067848 | A1 | 3/2007 | Gustave et al. |
| 2010/0153156 | A1 | 6/2010 | Guinta et al. |
| 2012/0180133 | A1* | 7/2012 | Al-Harbi .............. H04L 63/1433 726/25 |
| 2015/0381649 | A1* | 12/2015 | Schultz .............. G06Q 10/0635 726/25 |
| 2016/0261640 | A1* | 9/2016 | Modi ..................... H04L 63/14 |
| 2017/0085588 | A1 | 3/2017 | Laidlaw et al. |
| 2018/0146002 | A1* | 5/2018 | Canfield ............. H04L 63/1491 |
| 2018/0198815 | A1* | 7/2018 | Hovor ..................... H04L 63/14 |
| 2019/0207968 | A1 | 7/2019 | Heckman et al. |
| 2019/0244149 | A1 | 8/2019 | Krishnaswamy |
| 2019/0378067 | A1 | 12/2019 | Mo et al. |
| 2020/0092319 | A1* | 3/2020 | Spisak ..................... G06N 7/00 |
| 2020/0120128 | A1* | 4/2020 | Tamir ................. H04L 63/1433 |
| 2020/0120144 | A1* | 4/2020 | Yadav ................ G06Q 20/4016 |
| 2020/0267125 | A1* | 8/2020 | Gunasingam ........... H04L 63/20 |
| 2021/0273968 | A1* | 9/2021 | Shaieb ................ H04L 63/1433 |

OTHER PUBLICATIONS

"How much would a data breach cost your business?" IBM Security, IBM, Accessed: Jun. 9, 2020, URL: <https://www.ibm.com/security/data-breach> (6 pages).

Pokorny, Zane, "Threat Intelligence Feeds: Overview, Best Practices, and Examples", Recorded Future, Recorded Future, Inc., May 16, 2019, URL: <https://www.recordedfuture.com/threat-intelligence-feeds/> (10 pages).

CVE: Common Vulnerabilities and Exposures, The MITRE Corporation, URL: <https://cve.mitre.org/> (2 pages).

Garbade, Dr. Michael J., "Understanding K-means Clustering in Machine Learning", Towards Data Science, Medium, Sep. 12, 2018, URL: <https://towardsdatascience.com/understanding-k-means-clustering-in-machine-learning-6a6e67336aa1> (7 pages).

International Search Report and Written Opinion issued in Application No. PCT/US2020/045726, dated Mar. 2, 2021 (13 pages).

* cited by examiner

SYSTEM AND METHOD FOR VULNERABILITY REMEDIATION PRIORITIZATION

BACKGROUND

As the number of applications increases in an organization, risks associated with security vulnerabilities increase. For example, a cybersecurity risk may be exploited by one or more malicious parties to cause possible harm to an organization. In particular, vulnerabilities may result in unauthorized access to a computer system in order to perform unauthorized actions such as running code, installing malware, stealing and modifying sensitive data, etc. As time passes by, different vulnerabilities may appear that needs to be addressed for the security of the organization.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to one aspect, embodiments relate to a method that includes obtaining, by a computer processor, internal vulnerability data and external vulnerability data regarding various security vulnerabilities among various network elements for a predetermined organization. The method further includes determining, by the computer processor, various exploitability levels for the security vulnerabilities using a model, the external vulnerability data, and the internal vulnerability data. The model is generated using a machine-learning algorithm. The method further includes determining, by the computer processor, a vulnerability priority for the security vulnerabilities using the exploitability levels and organization-specific criteria. The vulnerability priority describes a sequence that the security vulnerabilities are remediated. The method further includes transmitting, by the computer processor and based on the vulnerability priority, a remediation command to a network elements among the network elements. The remediation command initiates a remediation procedure at the network element to address the security vulnerability.

According to one aspect, embodiments relate to a system that includes various network elements including various security vulnerabilities. The system further includes a vulnerability manager including a computer processor, where the vulnerability manager is coupled to the network elements. The vulnerability manager obtains internal vulnerability data and external vulnerability data regarding various security vulnerabilities for a predetermined organization. The vulnerability manager further obtains various exploitability levels for the various security vulnerabilities using a model, the external vulnerability data, and the internal vulnerability data. The model is generated using a machine-learning algorithm. The vulnerability manager further determines a vulnerability priority for the security vulnerabilities using the exploitability levels and organization-specific criteria. The vulnerability priority describes a sequence that the security vulnerabilities are remediated. The vulnerability manager further transmits a remediation command to a network elements among the network elements. The remediation command initiates a remediation procedure at the one of the network elements to address the security vulnerability.

According to one aspect, embodiments relate to a non-transitory computer readable medium storing instructions. The instructions obtain internal vulnerability data and external vulnerability data regarding various security vulnerabilities among various network elements for a predetermined organization. The instructions further determine various exploitability levels for the security vulnerabilities using a model, the external vulnerability data, and the internal vulnerability data. The model is generated using a machine-learning algorithm. The instructions further determine a vulnerability priority for the security vulnerabilities using the exploitability levels and organization-specific criteria. The vulnerability priority describes a sequence that the security vulnerabilities are remediated. The instructions further transmit a remediation command to a network element among the network elements. The remediation command initiates a remediation procedure at the network element to address the security vulnerability.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a system and a method for prioritizing remediation procedures for security vulnerabilities based on application risk levels. More specifically, application risk levels may be specially tailored towards threats experienced by a particular organization. In some embodiments, for example, a method uses machine learning to determine specific degrees of exploitability for calculating application risk levels for different vulnerabilities. Thus, a machine-learning model may use different datasets that include internal vulnerability data source and external vulnerability data from external data sources to determine such levels of exploitability. In some embodiments, remediation procedures may be prioritize regarding application risk levels based on this machine-learned exploitability. Consequently, an organization may prioritize remediation using artificial intelligence to address security vulnerabilities based on the organization's personal experience with cybersecurity threats according to their own business.

Furthermore, some embodiments provide a different approach to evaluating and managing remediation procedures than scoring systems in the industry. For example, a Common Vulnerabilities Scoring System (CVSS) may only score cybersecurity risk using generic metrics without considering other factors that are specific to an organization, i.e., trying to fit one scoring system for all organizations. As such, where the CVSS is an open industry standard for assessing severity of vulnerabilities, measuring risk with the CVSS may ignore vulnerability urgency that changes over time and as personal interests of the organization change.

Figure 1:
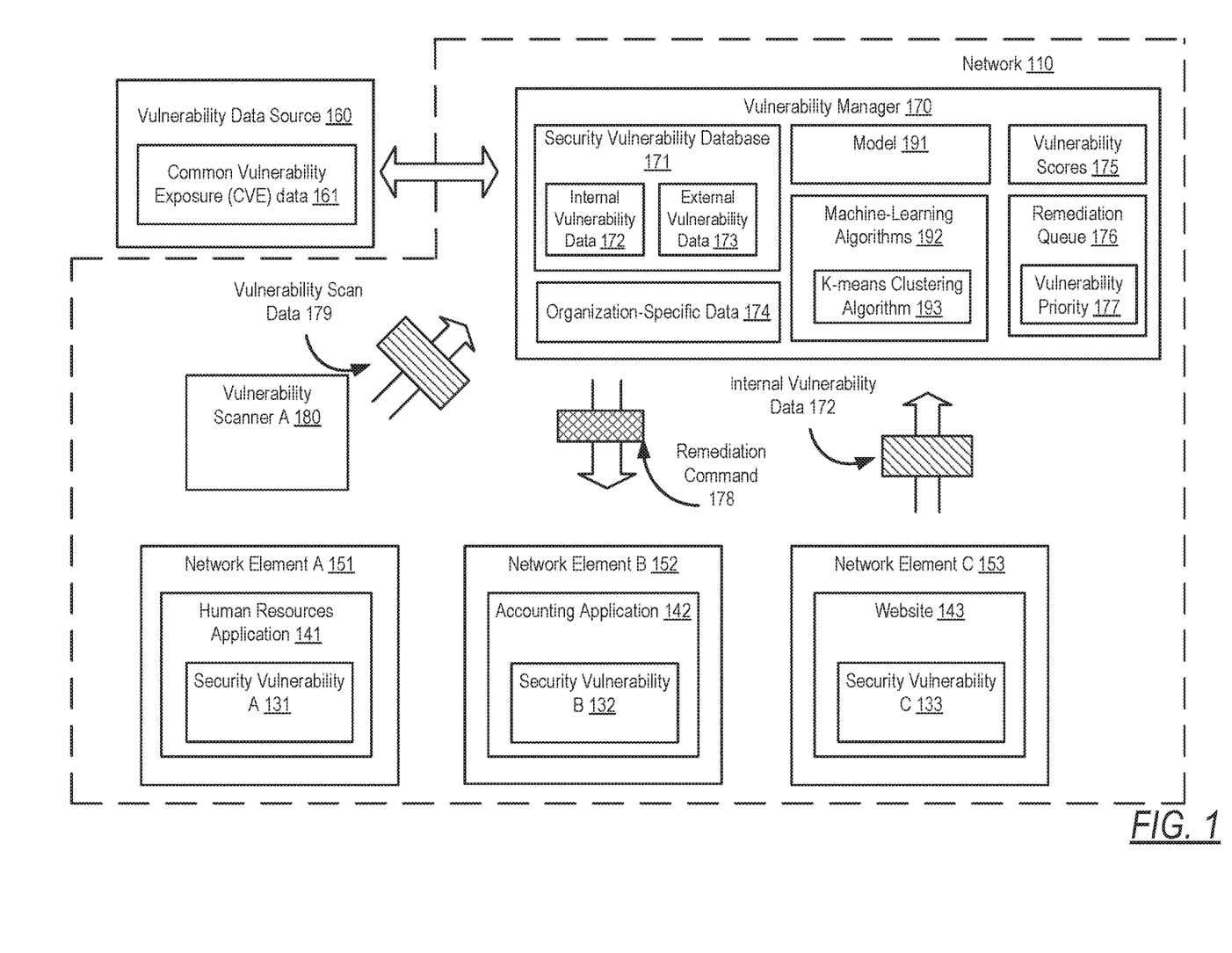
FIG. 1 shows a system in accordance with one or more embodiments.

FIG. 1 shows a block diagram of a system in accordance with one or more embodiments. As shown in FIG. 1, a network (e.g., network (110)) may include various network elements (e.g., network element A (151), network element B (152), and network element C (153), etc.) that may be coupled to a vulnerability manager (e.g., vulnerability manager (170)). A network element may refer to various hardware components within a network, such as switches, routers, and hubs, as well as user devices, servers, network storage devices, user equipment, or any other logical entities for uniting one or more physical devices on the network. User devices may include personal computers, smartphones, human machine interfaces, and any other devices coupled to a network that obtain inputs from one or more users. A vulnerability manager may be software and/or hardware implemented on a network, such as a network controller, and include functionality for detecting and/or managing security vulnerabilities. For example, a vulnerability manager may collect vulnerability data, process vulnerability data, evaluate applications risk levels, and/or manage remediation procedures. With regard to vulnerability data, vulnerability data may include information relating to one or more security vulnerabilities regarding network elements, software applications, etc. In some embodiments, a vulnerability manager, network elements, user equipment, user devices, servers, and/or network storage devices may be computing systems similar to the computing system (500) described in FIGS. 5A and 5B, and the accompanying description.

Furthermore, a network may include various applications being operated for an organization (e.g., human resources application (141), accounting application (142), website (143)). For example, a human resource application may include software that manages employee profiles, employee training, employee applicant tracking, vacation days, etc. In another example, an accounting application may include software that manages individual sales, billing information, bank accounts, etc. In particular, an accounting application may include sales management software that includes functionality for managing sales personnel's contacts and/or tracking sales transactions. Likewise, a website may be a company's website that advertises an organization's products and/or services, as well as a website for internal use, such as an email server that provides remote access to employees. As such, these applications may include hardware and/or software with one or more security vulnerabilities (e.g., security vulnerability A (131), security vulnerability B (132), security vulnerability C (133)) that are specific to the corresponding application.

In some embodiments, a vulnerability manager includes functionality for determining amounts of cybersecurity risk using internal vulnerability data (e.g., internal vulnerability data (172)) and/or external vulnerability data (e.g., external vulnerability data (173)). More specifically, internal vulnerability data may include information that describes one or more cybersecurity attacks that target an organization specifically, such as attacks against a company's website. For example, internal vulnerability data may be obtained from an internal data feed that records a frequency and/or types of attacks against various network elements.

In contrast to internal vulnerability data, external vulnerability data may be publically-available data regarding known security vulnerabilities. In some embodiments, for example, external vulnerability includes Common Vulnerability Exposure (CVE) data (e.g., CVE data (161)). In particular, CVE data may provide a list of publicly-known security vulnerabilities and exposures for different hardware devices as well as different software applications. CVE data may include a data entry with a brief description of the security vulnerability or exposure, such that CVE data may include a CVE ID number to share data across separate network security databases. An example of the CVE ID is CVE-YYYY-NNNN, where YYYY refers to a particular year when a vulnerability is discovered, and NNNN refers to arbitrary string identifying the security vulnerability. To be qualified for a CVE entry, a vulnerability may need to be independently fixable by affected vendors without modifying internal workflows of an organization.

Keeping with external vulnerability data, a vulnerability manager may include functionality to obtain external vulnerability data from a vulnerability data source (e.g., vulnerability data source (160)) located outside a network. For example, a vulnerability data source may be a publicly-available database located on the Internet that includes functionality for communicating with a vulnerability manager. In some embodiments, a vulnerability manager obtains external vulnerability data in response to detecting one or more security vulnerabilities using a vulnerability scan (e.g., vulnerability scan data (179)) performed by a vulnerability scanner (e.g., vulnerability scanner A (180)). For example, a vulnerability scanner includes hardware and/or software with functionality to scan various network elements and/or applications in a network. For example, the vulnerability scanner (180) may be an Application Security Testing (AST) tool that automatically detects the security vulnerabilities (131) among various network elements and/or applications in the network. In one or more embodiments, the vulnerability manager (170) includes a security vulnerability database (e.g., security vulnerability database (171)) that include functionality to store internal vulnerability data and the external vulnerability data.

In one or more embodiments, the vulnerability manager (170) may be software and/or hardware that generates vulnerability scores (e.g., vulnerability scores (175)) using the stored data from the security vulnerability databases (171). In particular, a vulnerability score may correspond to a predetermined risk level that determines a priority level (e.g., vulnerability priority (177)) for remediation. For example, a security vulnerability with a higher vulnerability score may have a respective remediation procedure before a security vulnerability with a lower score. For more information on vulnerability scores, see FIG. 4 and the accompanying description below.

In one or more embodiments, the vulnerability manager (170) may uses a model (e.g., model (191)) and a machine-learning algorithm (e.g., machine-learning algorithm (192)) to determine vulnerability scores. More specifically, a vulnerability manager may use internal vulnerability data and external vulnerability data to predict exploitability levels with respect to a particular security vulnerability. In particular, exploitability may describe an impact severity to an organization should a security vulnerability become compromised by a malicious third party. Likewise, a model may include support vector machines, decision trees, inductive learning models, neural networks, deductive learning models, unsupervised learning models, etc. The machine-learning algorithm may include supervised and unsupervised algorithms. Through machine learning, a model may be trained to determine which data inputs should receive greater priority in determining a predicted output. The model and the machine-learning algorithm (192) will be further described below in FIG. 2 below and the accompanying description.

In some embodiments, for example, a machine-learning algorithm is a k-means clustering algorithm (e.g., k-means clustering algorithm (193)). K-means clustering may describe an unsupervised algorithm with a vector quantization method that uses cluster analysis to label data points. A cluster may include a collection of data points aggregated together due to similarities among the data points. In k-means clustering, a target number k is determined, wherein k refers to a number of centroids in datasets and means refers to averaging of the datasets. By reducing the in-cluster sum of squares, a k-means algorithm may identify a k number of centroids, and then allocates data points to a particular cluster. For example, a vulnerability manager may use the k-means algorithm to data mine by starting with an initial group of randomly selected centroids for every cluster. After determining an initial group, the vulnerability manager may iteratively optimize the positions of the centroids.

Figure 2:
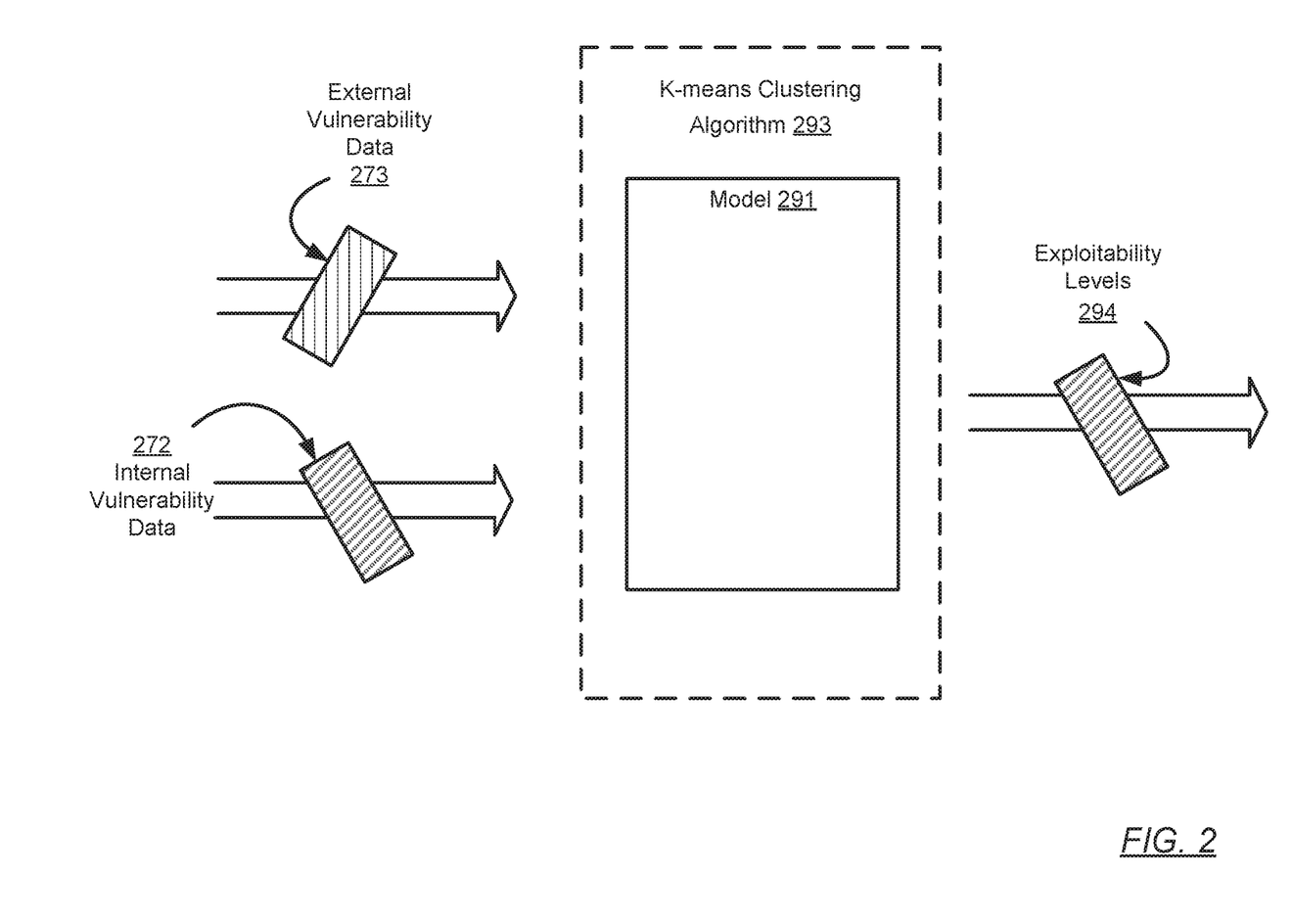
FIG. 2 shows a system in accordance with one or more embodiments.

Turning to FIG. 2, FIG. 2 provides an example of generating a model to predict exploitability levels. The following example is for explanatory purposes only and not intended to limit the scope of the disclosed technology. In FIG. 2, a model ((e.g., model (291)) is trained using a k-means clustering algorithm (e.g., k-means clustering algorithm (293)) for predicting exploitability levels (e.g., exploitability levels (294)). In particular, the model (291) obtains two inputs for training, i.e., internal vulnerability data (e.g., internal vulnerability data (272)) and external vulnerability data (e.g., external vulnerability data (273)).

Returning to FIG. 1, a vulnerability manager includes hardware and/or software with functionality to determine risk levels using organization-specific criteria (e.g., organization-specific criteria (174)) with exploitability levels. For example, organization-specific criteria may include data that describes information security with respect to an organization. In particular, the organization-specific criteria may refer to a Confidentiality-Integrity-Availability (CIA) triad. The CIA triad may refer to an information security model that guides an organization to maintain its data security. As such, some applications have highly sensitive data that may need to be protected against any unauthorized access or modification, which reflects on the confidentiality aspect. Likewise, some application data may need to be maintained in an accurate state and protected against unauthorized modification, which reflects on the integrity aspect. Some applications may need to be available at predetermined times, which reflects on the availability aspect. In one or more embodiments, the organization-specific criteria assigns a respective confidentiality level, a respective integrity level, and a respective availability level to the network elements. These respective levels may be used by a vulnerability manager to determine vulnerability scores and thus various degrees of vulnerability priority. Accordingly, different applications and network elements may have different values with respect to their respective organization-specific criteria.

In some embodiments, a vulnerability manager includes functionality for transmitting one or more remediation commands (e.g., remediation command (178)) based on one or more vulnerability scores and/or vulnerability priority. In particular, a remediation command may be a network message that causes one or more remediation procedures to be performed automatically by a network element or application. Examples of remediation procedures include one or more of the following: identifying and closing a network blind spot; installing a software patch or update with respect to a security vulnerability in a software application or network element; changing configuration settings on a network element; removing an unsecured network connection; or adjusting a predetermined workflow or rule associated with a particular software application. In some embodiments, a vulnerability manager includes a remediation queue (e.g., remediation queue (176)) that organizes the sequence that remediation procedures are implemented in a network. For example, a remediation queue may be based on different vulnerability priority values assigned to different security vulnerabilities. In the remediation queue (176), remediation procedures may be prioritized from security vulnerabilities with a high urgency to those with a low urgency.

While FIGS. 1 and 2 show various configurations of components, other configurations may be used without departing from the scope of the disclosure. For example, various components in FIGS. 1 and 2 may be combined to create a single component. As another example, the functionality performed by a single component may be performed by two or more components.

Figure 3:
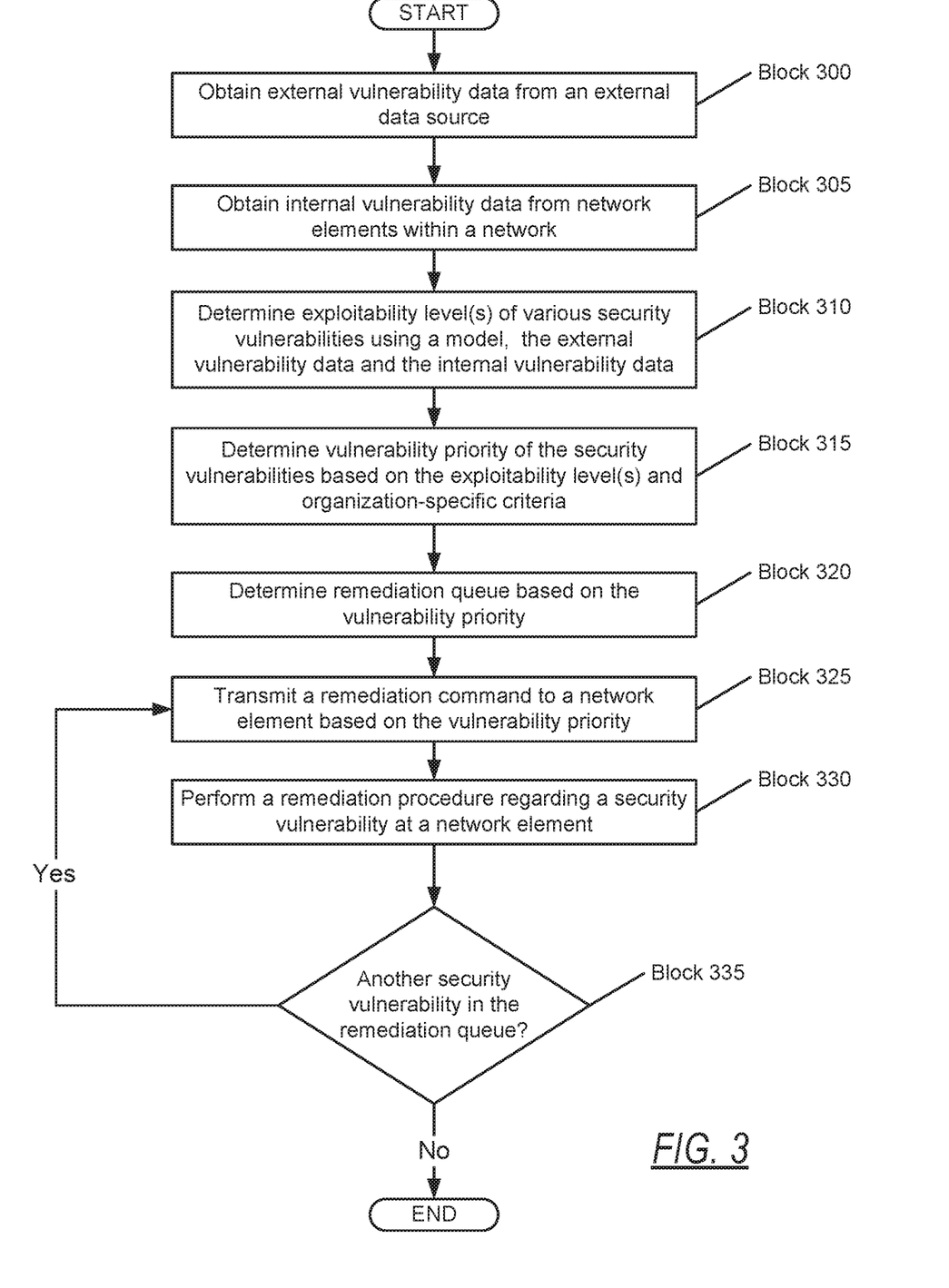
FIG. 3 shows a flowchart in accordance with one or more embodiments.

Turning to FIG. 3, FIG. 3 shows a flowchart in accordance with one or more embodiments. Specifically, FIG. 3 describes a general method for performing a remediation procedure regarding a security vulnerability. One or more blocks in FIG. 3 may be performed by one or more components (e.g., vulnerability manager (170)) as described in FIG. 1. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, external vulnerability data is obtained in accordance with one or more embodiments. After detecting one or more security vulnerabilities using a vulnerability scanner, for example, a vulnerability manager may acquire CVE data from a vulnerability data resource regarding the detected vulnerabilities.

In Block 305, internal vulnerability data is obtained in accordance with one or more embodiments. In particular, an internal data feed may notify a vulnerability manager regarding one or more cybersecurity attacks on different network elements within an organization. As such, information from the internal data feed may be parsed with respect to various hardware devices and/or network applications to determine internal vulnerability data.

In Block 310, one or more exploitability levels of the various security vulnerabilities are determined using a model, external vulnerability data, and internal vulnerability data in accordance with one or more embodiments. For example, a model may be similar to the model (191) describes in FIG. 1 and the accompanying description. Likewise, the machine-learning algorithm may be a k-means clustering algorithm or another type of machine-learning algorithm. As such, an exploitability level may differ between organizations for the same security vulnerability based on their past cybersecurity attack history. In other words, for a specific organization, a CVE with high CVSS score may not have high remediation urgency. Likewise, a high exploitability level may indicate a strong attack possibility of a particular vulnerability to an organization.

In Block 315, a vulnerability priority of various security vulnerabilities is determined based on one or more exploitability levels and organization-specific criteria in accordance with one or more embodiments. For example, a vulnerability manager may determine a vulnerability score for a particular security vulnerability based on the corresponding exploitability level and organization-specific criteria. The vulnerability scores for different security vulnerabilities may be organized in order to define a vulnerability priority for managing remediation procedures. The organization-specific criteria may be a subjective value provided by cybersecurity analysts or members of the organization. For example, organizations-specific criteria may provide an additional weight to increasing and/or decreasing the risk associated with a particular security vulnerability.

In Block 320, a remediation queue is determined based on a vulnerability priority in accordance with one or more embodiments. For example, the remediation queue may be similar to the remediation queue (176) described above in FIG. 1 and the accompanying description.

In Block 325, a remediation command is transmitted to a network element in accordance with one or more embodiments. In some embodiments, a vulnerability manager may perform remediation monitoring and/or remediation procedures over a network. More specifically, a vulnerability manager may track implementation of various remediation procedures, e.g., with a remediation queue, and determine the status of implementing a particular remediation procedure. For example, a vulnerability manager may schedule different remediation procedures for different times and in a predetermined sequence. This schedule may be controlled and/or adjusted using remediation commands, for example. In some embodiments, a remediation command is similar to the remediation commands described above in FIG. 1 and the accompanying description.

In Block 330, a remediation procedure is performed regarding a security vulnerability at a network element in accordance with one or more embodiments.

In Block 335, a determination is made whether another security vulnerability is in a remediation queue in accordance with one or more embodiments. If there is another vulnerability in the remediation queue, then the vulnerability manger may implement the next remediation procedure for the next security vulnerability. Specifically, a new remediation command may transmitted to a network element for the security vulnerability that has the current highest vulnerability priority in the remediation queue. If at least one security vulnerability remains in the remediation queue, the process proceeds to Block 325. If no vulnerabilities remain in the remediation queue, the process ends.

Figure 4:
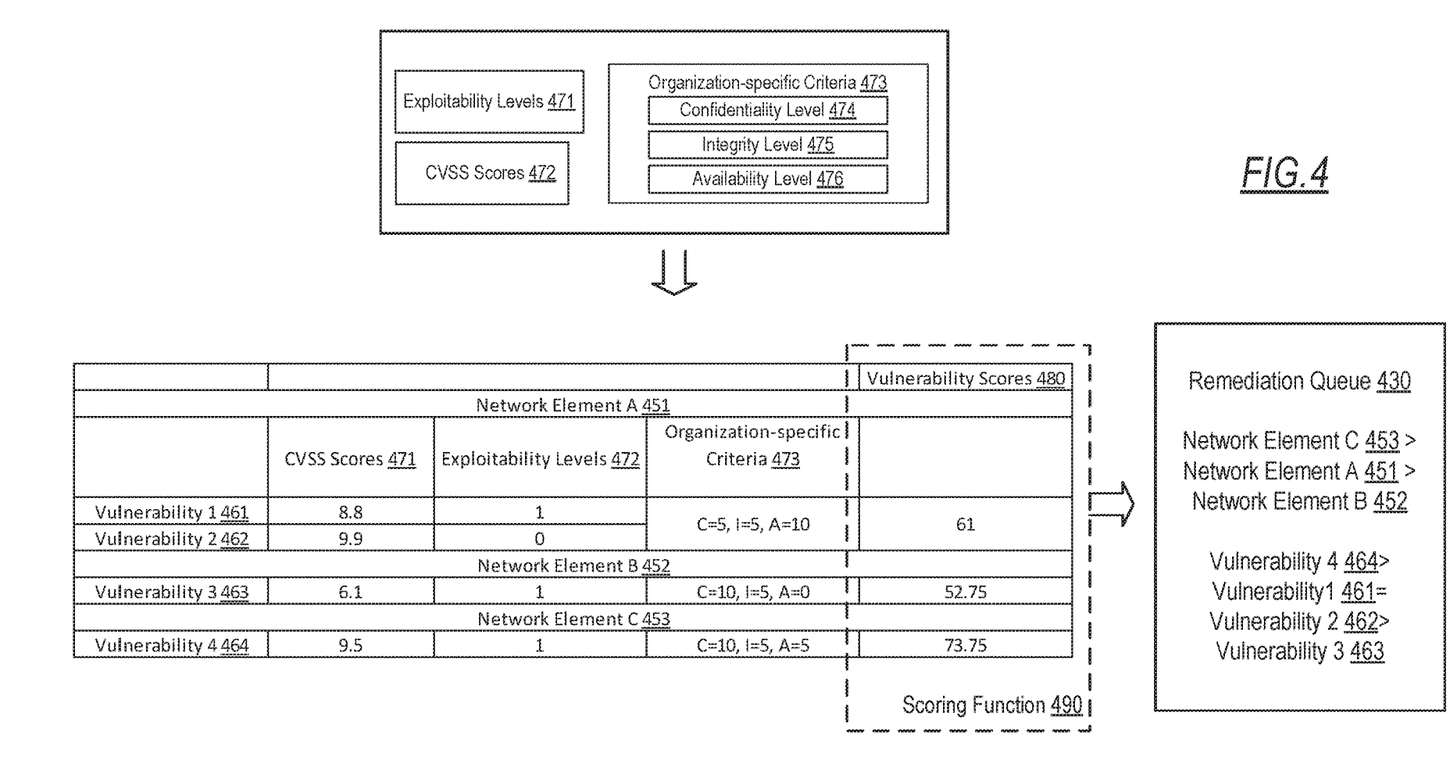
FIG. 4 shows an example in accordance with one or more embodiments.

Turning to FIG. 4, FIG. 4 provides an example of generating a remediation queue. As shown as FIG. 4, a vulnerability manager determines various vulnerability scores (480) using a scoring function (490). In particular, the vulnerability scores (480) are determined from exploitability levels (471), organization-specific criteria (473), and CVSS scores (472). Likewise, the vulnerability scores (480) describe various risk levels for security vulnerabilities in different network elements (i.e., network element A (451), network element B (452), network element C (453)). For example, a vulnerability score for one network element may be a composite score determined using the following equation:

$$\text{Composite Score} = \frac{\frac{V_1 E_1 + V_2 E_2 + \ldots + V_n E_n}{n} + C + I + A}{40} * 100 \qquad \text{Equation 1}$$

where $V_n$ is the CVSS score (471) of the $n^{th}$ vulnerability in a network element; $E_n$ is the exploitability level of the $n^{th}$ vulnerability; and C, I, and A are the confidentiality level (474), integrity level (475), and availability level (476) of the organization-specific criteria (473) for the network element (451), respectively.

Keeping with FIG. 4, a remediation queue (430) is generated based on the vulnerability scores (480) in a high to low order. According to the example in FIG. 4, the remediation procedures are arranged according to network element C (453)>network element A (451)>network element B (452) and vulnerability 4 (464)>vulnerability 1 (461)= vulnerability 2 (462)>Vulnerability 3 (463). Another example of a remediation queue may be found in Table 1 below:

TABLE 1

Remediation Queue Example

| Application | Risk Level | Priority |
|---|---|---|
| HR Application | 61 | $2^{nd}$ |
| Sales Application | 52.75 | $3^{rd}$ |
| Company Website | 73.75 | $1^{st}$ |

Figure 5A:
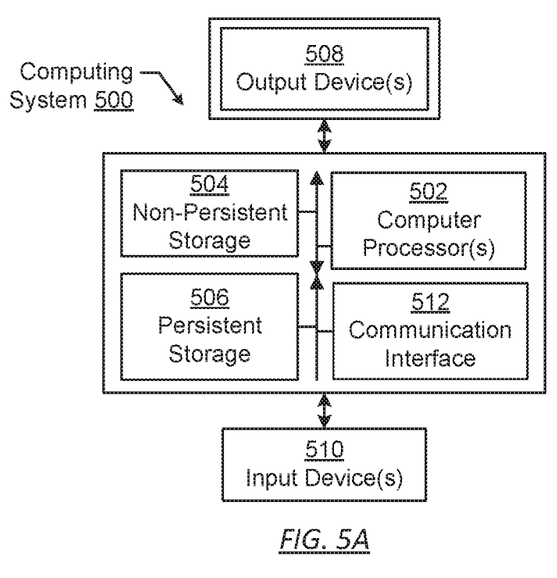
FIGS. 5A and 5B show a computing system in accordance with one or more embodiments.

Embodiments may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 5B:
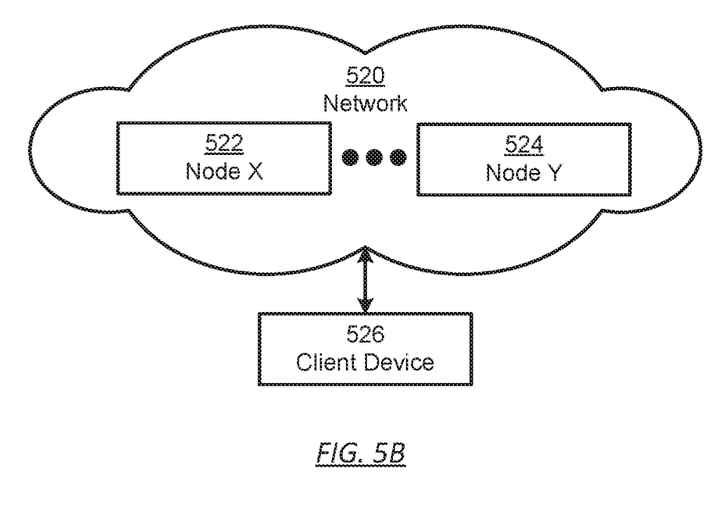

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the disclosure.

The computing system or group of computing systems described in FIGS. 5A and 5B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method, comprising:
obtaining, by a computer processor, internal vulnerability data and external vulnerability data regarding a plurality of security vulnerabilities among a plurality of network elements for a predetermined organization;
determining, by the computer processor, a plurality of exploitability levels for the plurality of security vulnerabilities using a model, the external vulnerability data, and the internal vulnerability data, wherein the model is generated using a machine-learning algorithm;
determining, by the computer processor, a vulnerability priority for the plurality of security vulnerabilities using the plurality of exploitability levels and organization-specific criteria, wherein the vulnerability priority describes a sequence that the plurality of security vulnerabilities are remediated; and
transmitting, by the computer processor and based on the vulnerability priority, a remediation command to a network element comprising a security vulnerability among the plurality of security vulnerabilities,
wherein the remediation command initiates a remediation procedure at the network element to address the security vulnerability,
wherein the organization-specific criteria corresponds to a respective confidentiality level, a respective integrity level, and a respective availability level to a respective software application operating among the plurality of network elements, and
wherein the vulnerability priority is determined based on a plurality of vulnerability scores for the plurality of security vulnerabilities based on a respective exploitability level, the respective confidentiality level, the respective integrity level, and the respective availability level.

2. The method of claim 1,
wherein the internal vulnerability data is based on one or more cybersecurity attacks towards one or more network elements among the plurality of network elements that are detected by the predetermined organization.

3. The method of claim 1,
wherein the external vulnerability data is common vulnerabilities and exposures (CVE) data that describe publicly-available security information, and
wherein the external vulnerability data is obtained from a CVE data feed.

4. The method of claim 1, wherein the machine-learning algorithm is a k-means clustering algorithm that identifies a cybersecurity attack possibility of a predetermined software application.

5. The method of claim 1, wherein the remediation procedure comprises an installation of a software update to the network element that eliminates the security vulnerability.

6. The method of claim 1, further comprising:
determining, by the computer processor, a remediation queue that organizes a plurality of remediation procedures based on the vulnerability priority,
wherein the remediation queue describes a sequence that a plurality of security vulnerabilities are remediated.

7. A system, comprising:
a plurality of network elements comprising a plurality of security vulnerabilities; and
a vulnerability manager comprising a computer processor, wherein the vulnerability manager is coupled to the plurality of network elements and is configured to:
obtain internal vulnerability data and external vulnerability data regarding the plurality of security vulnerabilities for a predetermined organization;
determine a plurality of exploitability levels for the plurality of security vulnerabilities using a model, the external vulnerability data, and the internal vulnerability data, wherein the model is generated using a machine-learning algorithm;

determine a vulnerability priority for the plurality of security vulnerabilities using the plurality of exploitability levels and organization-specific criteria, wherein the vulnerability priority describes a sequence that the plurality of security vulnerabilities are remediated; and transmit, based on the vulnerability priority, a remediation command to a network element among the plurality of network elements, wherein the network element comprises a security vulnerability among the plurality of security vulnerabilities, wherein the remediation command initiates a remediation procedure at the one of the plurality of network elements to address the security vulnerability, wherein the organization-specific criteria corresponds to a respective confidentiality level, a respective integrity level, and a respective availability level to a respective software application operating among the plurality of network elements, and wherein the vulnerability priority is determined based on a plurality of vulnerability scores for the plurality of security vulnerabilities based on a respective exploitability level, the respective confidentiality level, the respective integrity level, and the respective availability level.

8. The system of claim 7, further comprising:

a security vulnerability databases comprising the internal vulnerability data, wherein the internal vulnerability data is based on one or more cybersecurity attacks towards one or more network elements among the plurality of network elements that are detected by the predetermined organization.

9. The system of claim 7, wherein the external vulnerability data is common vulnerabilities and exposures (CVE) data that describe publicly-available security information, and wherein the external vulnerability data is obtained from a CVE data feed.

10. The system of claim 7, the vulnerability manager is further configured to:

determine a remediation queue that organizes a plurality of remediation procedures based on the vulnerability priority, wherein the remediation queue describes a sequence that a plurality of security vulnerabilities are remediated.

11. The system of claim 7, wherein the remediation procedure comprises an installation of a software update to the network element that eliminates the security vulnerability.

12. A non-transitory computer readable medium storing instructions, the instructions comprising functionality for:

obtaining internal vulnerability data and external vulnerability data regarding a plurality of security vulnerabilities among a plurality of network elements for a predetermined organization;

determining a plurality of exploitability levels for the plurality of security vulnerabilities using a model, the external vulnerability data, and the internal vulnerability data, wherein the model is generated using a machine-learning algorithm;

determining a vulnerability priority for the plurality of security vulnerabilities using the plurality of exploitability levels and organization-specific criteria, wherein the vulnerability priority describes a sequence that the plurality of security vulnerabilities are remediated; and transmitting, based on the vulnerability priority, a remediation command to a network element comprising a security vulnerability among the plurality of security vulnerabilities, wherein the remediation command initiates a remediation procedure at the network element to address the security vulnerability, wherein the organization-specific criteria corresponds to a respective confidentiality level, a respective integrity level, and a respective availability level to a respective software application operating among the plurality of network elements, and wherein the vulnerability priority is determined based on a plurality of vulnerability scores for the plurality of security vulnerabilities based on a respective exploitability level, the respective confidentiality level, the respective integrity level, and the respective availability level.

13. The non-transitory computer readable medium of claim 12, wherein the internal vulnerability data is based on one or more cybersecurity attacks towards one or more network elements among the plurality of network elements that are detected by the predetermined organization.

14. The non-transitory computer readable medium of claim 12, wherein the external vulnerability data is common vulnerabilities and exposures (CVE) data that describe publicly-available security information, and wherein the external vulnerability data is obtained from a CVE data feed.

15. The non-transitory computer readable medium of claim 12, wherein the machine-learning algorithm is a k-means clustering algorithm that identifies a cybersecurity attack possibility of a predetermined software application.

16. The non-transitory computer readable medium of claim 12, wherein the remediation procedure comprises an installation of a software update to the network element that eliminates the security vulnerability.

17. The non-transitory computer readable medium of claim 12, wherein the internal vulnerability data and the external vulnerability data are obtained from a security vulnerability database on a network.

* * * * *